United States Patent
Hosoyama (10) Patent No.: US 9,768,692 B2
(45) Date of Patent: Sep. 19, 2017

(54) POWER SUPPLY DEVICE AND INFORMATION PROCESSING APPARATUS

(71) Applicant: FUJITSU LIMITED, Kawasaki-shi, Kanagawa (JP)

(72) Inventor: Hisato Hosoyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 71 days.

(21) Appl. No.: 14/692,858

(22) Filed: Apr. 22, 2015

(65) Prior Publication Data

US 2015/0349639 A1    Dec. 3, 2015

(30) Foreign Application Priority Data

Jun. 2, 2014  (JP) .................. 2014-113932

(51) Int. Cl.
*H02M 3/156* (2006.01)
*H02M 3/158* (2006.01)
*H02M 3/157* (2006.01)
*H02M 1/44* (2007.01)
*H02M 1/00* (2006.01)

(52) U.S. Cl.
CPC ............ *H02M 3/158* (2013.01); *H02M 1/44* (2013.01); *H02M 3/156* (2013.01); *H02M 3/157* (2013.01); *H02M 2001/0025* (2013.01)

(58) Field of Classification Search
CPC .... H02M 3/156; H02M 3/158; H02M 3/1588; H02M 2003/1566; H02M 3/155; H02M 3/1582; H02M 2003/1557; H02M 3/157; H02M 2001/0012; H02M 3/1563; H02M 2001/0009; H04B 2215/069
See application file for complete search history.

(56) References Cited

U.S. PATENT DOCUMENTS

2009/0102446 A1* 4/2009 Takahashi ............. H02M 3/157
323/283
2012/0249093 A1* 10/2012 Grbo ................... H02M 3/1588
323/234

(Continued)

FOREIGN PATENT DOCUMENTS

| JP | 2009-100607 | 5/2009 |
| JP | 2013-38916 | 2/2013 |
| JP | 2014-161190 | 9/2014 |

*Primary Examiner* — Timothy J Dole
*Assistant Examiner* — Bryan R Perez
(74) *Attorney, Agent, or Firm* — Staas & Halsey LLP (57) ABSTRACT

A power supply device comprising: a switching power supply unit which operates in accordance with a PWM signal; and a controller configured to generate the PWM signal, the controller includes: a switching frequency control unit configured to generate a spreading spectrum signal whose period is changed, an output voltage detecting unit configured to detect an output voltage of the switching power supply unit, a reference voltage unit configured to generate a reference voltage, a difference computing unit configured to calculate a difference between the output voltage and the reference voltage, a compensator configured to generate a compensating value from an input voltage of the switching power supply unit, the reference voltage, and the period of the spreading spectrum signal, and a PWM generator configured to generate the PWM signal from the spreading spectrum signal and the compensating value.

5 Claims, 9 Drawing Sheets (56) References Cited

U.S. PATENT DOCUMENTS

2013/0049714 A1\* 2/2013 Chiu .................. H02M 3/156
 323/271
2014/0232365 A1 8/2014 Sasaki et al.

\* cited by examiner

POWER SUPPLY DEVICE AND INFORMATION PROCESSING APPARATUS

CROSS-REFERENCE TO RELATED APPLICATION

This application is based upon and claims the benefit of priority of the prior Japanese Patent Application No. 2014-113932 filed on Jun. 2, 2014, the entire contents of which are incorporated herein by reference.

FIELD

The embodiments discussed herein are related to a power supply device and an information processing apparatus.

BACKGROUND

A high efficiency and a high power output have been demanded for the power supply, and a switching power supply device is used to meet the demands. As the switching power supply device, a transistor is controlled to be turned on/off by a switching signal, and a duty ratio of the switching signal is changed so that the output power is constantly maintained regardless of a load. Therefore, the switching signal is referred to as a pulse width modulation (PWM) signal. In detail, a difference between an output voltage and a reference voltage is calculated and the duty ratio of the switching signal is changed depending on the difference to control the output voltage to be close to the reference voltage.

In the switching power supply device, a direction of flowing current is switched by controlling the transistor to be turned on/off by the switching signal so that significantly large switching noise is caused. The switching noise acts as an electromagnetic field radiation noise to the outside so as to cause electromagnetic interference in surrounding electronic devices. Therefore, in the switching power supply device, the noise needs to be suppressed from occurring.

In order to suppress the noise from occurring, it is widely known that a spread spectrum signal is used. The spread spectrum signal is a signal whose period varies by several percent and, for example, an IC including a dedicated spread spectrum clock generator which generates a spread spectrum clock is provided.

It is known that in the switching power supply device, the period of a switching operation is changed with the switching signal as a spread spectrum signal, thereby reducing a noise amount at a switching frequency. Therefore, it may be suggested to mount the dedicated IC including the spread spectrum clock generator on the switching power supply device to generate a spread spectrum switching signal. However, the dedicated IC including the spread spectrum clock generator is expensive so that a cost for the switching power supply device is increased.

Therefore, it is considered that a controller configured to control the switching power supply device generates the spread spectrum switching signal. However, since a period of the spread spectrum switching signal varies, when a difference between the output voltage and the reference voltage is obtained and a duty ratio of the switching signal is changed in accordance with the difference, an output voltage of the switching power supply device undesirably varies.

Even though it is considered to correct the duty ratio so as to reduce the variation of the output voltage, the period of the spread spectrum switching signal is changed at every switching period, so that an operation for correction needs to be frequently performed. In order to perform the operation, a high performance and high speed operating circuit is required and a cost for the switching power supply device is increased.

The following are reference documents.
[Document 1] Japanese Laid-Open Patent Publication No. 2013-038916 and
[Document 2] Japanese Laid-Open Patent Publication No. 2009-100607.

SUMMARY

According to an aspect of the invention, A power supply device comprising: a switching power supply unit which operates in accordance with a PWM signal; and a controller configured to generate the PWM signal, the controller includes: a switching frequency control unit configured to generate a spreading spectrum signal whose period is changed, an output voltage detecting unit configured to detect an output voltage of the switching power supply unit, a reference voltage unit configured to generate a reference voltage, a difference computing unit configured to calculate a difference between the output voltage and the reference voltage, a compensator configured to generate a compensating value from an input voltage of the switching power supply unit, the reference voltage, and the period of the spreading spectrum signal, and a PWM generator configured to generate the PWM signal from the spreading spectrum signal and the compensating value, and wherein the reference voltage unit changes the generated reference voltage in accordance with a change of the period of the spreading spectrum signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Prior to describing the embodiment, a general switching power supply device using a spread spectrum switching signal and a general switching power supply device which changes a frequency of the switching signal will be described.

In an electronic device, an electromagnetic radiation noise is required to satisfy various standards.

As described above, in the switching power supply device, a switching noise needs to be suppressed and the switching noise is considered as a main generation source of a radiation noise of the electronic device so that it is required to reduce the radiation noise. A reduction measure of the radiation noise in the electronic device may be performed by adding hardware such as a shielding material or a filter through a cut-and-try method in many cases, which results in increasing a cost for the electronic device.

When the switching power supply device is a single body, even though the radiation noise is in an acceptable range, the radiation noise may be increased when the power supply device is mounted in the electric device to be connected with other operational circuit parts. Therefore, it is further required for the switching power supply device to further reduce the radiation noise.

In order to suppress the noise from occurring, it is widely known that a spread spectrum signal is used. The spread spectrum signal is a signal whose period varies by several percent and, for example, an IC including a dedicated spread spectrum clock generator which generates a spread spectrum clock is provided. By using this, a peak of the radiation noise is reduced. However, the dedicated IC including the spread spectrum clock generator is expensive, and the mounting of the CI causes a significant cost increase of the switching power supply device.

Therefore, it is considered that a controller configured to control the switching power supply device generates the spread spectrum switching signal. However, since a period of the spread spectrum switching signal varies, when a difference between the output voltage and the reference voltage is obtained and a duty ratio of the switching signal is changed in accordance with the difference, an output voltage of the switching power supply device undesirably varies.

Patent Document 1 discloses a switching power supply device in which when a period of the switching signal is changed, an on/off duty ratio is changed so that even when the switching frequency is spectrally spread, the output voltage is stabilized, thereby reducing the electromagnetic noise. However, an operating processing in a digital control unit of the switching power supply device is a complex digital processing using data of an input voltage, an output voltage, and an output current. Therefore, in order to stabilize an output voltage in accordance with a change of a frequency of a spectrally spread switching signal, an expensive operator (e.g., CPU or DSP) having a higher operating speed is used, which may cause a significant increase of a cost for the switching power supply device.

Patent Document 2 discloses a switching power supply device which is not a device which spectrally spreads the switching frequency, but changes a switching frequency in accordance with a load in order to maintain high conversion efficiency, thereby stabilizing an output voltage at the time of changing the switching frequency.

Figure 1:
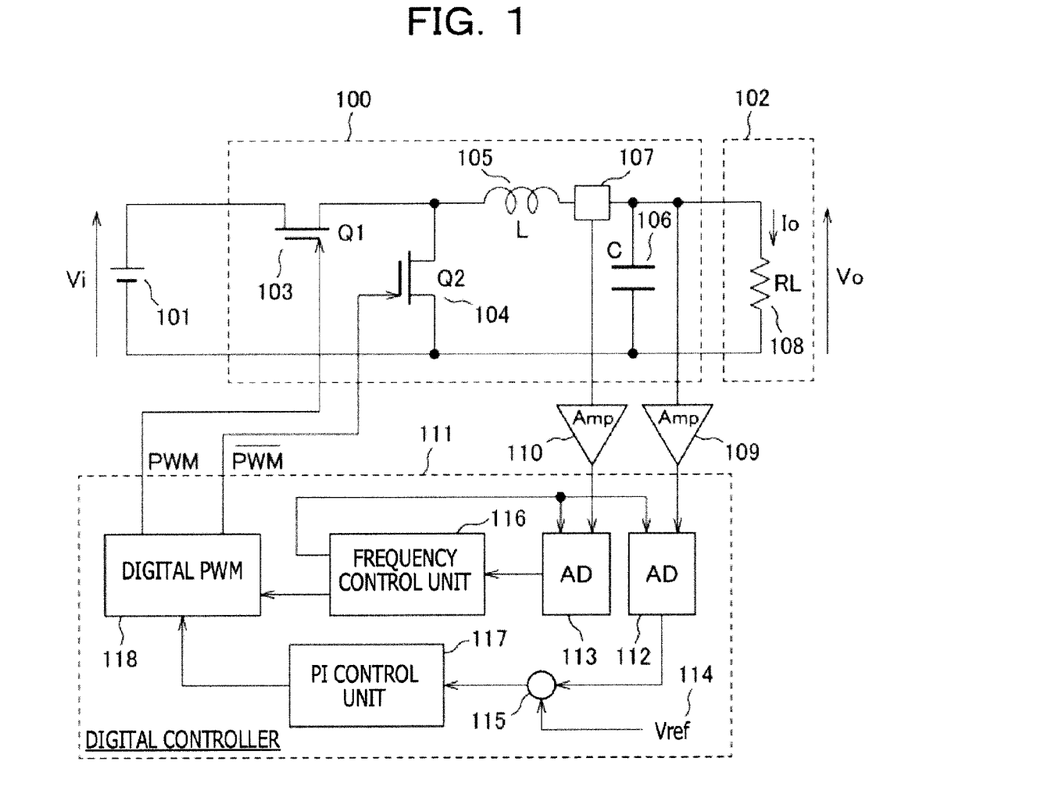
FIG. 1 is a view illustrating a configuration of a switching power supply device described in Patent Document 2.

FIG. 1 is a view illustrating a configuration of a switching power supply device described in Patent Document 2.

The power supply device of FIG. 1 includes a DC input power supply 101, a switching power supply circuit 100, amplifiers 109 and 110 which detect an output voltage and an output current, and a digital controller 111. A load 102 is connected to the switching power supply circuit 100. The digital controller 111 includes AD converters 112 and 113 which convert an output voltage and an output current into digital data, a reference voltage source 114, a difference computing unit 115, a frequency control unit 116, a compensator (a PI control unit) 117, and a PWM signal generator 118. The compensator (PI control unit) 117 performs a proportional integral (PI) operation on the reference voltage output from the difference computing unit 115 with respect to an error of a difference of the output voltage. Parts except for the AD converter 113 and the frequency control unit 116 have the same configuration as a digital controller of the most general switching power supply device.

In the power supply device of FIG. 1, the frequency control unit 116 changes the switching frequency in accordance with a load current (an output current) and changes a sampling period of the AD converters 112 and 113 in accordance with the switching frequency to control the PWM signal generation at every period. Therefore, an output current having a constant ripple current may be highly efficiently obtained through a wide range of the load current.

However, in the power supply device in FIG. 1, since the output voltage and the output current are detected at every sampling period to control the PWM signal generation, the computing processing is complicated and is required to be performed at a high speed. Therefore, also in the power supply device in FIG. 1, an expensive operator (e.g., CPU or DSP) having a high operating speed is used, which causes a significant increase of a cost for the switching power supply device.

A switching power supply device according to an embodiment which will be described below reduces a radiation noise using a spread spectrum switching signal and also reduces an operating amount by the digital processing in order to reduce a change of the output voltage in accordance with the change of the switching frequency. Accordingly, the digital controller of the switching power supply device may be implemented by a cheap operator.

Figure 2:
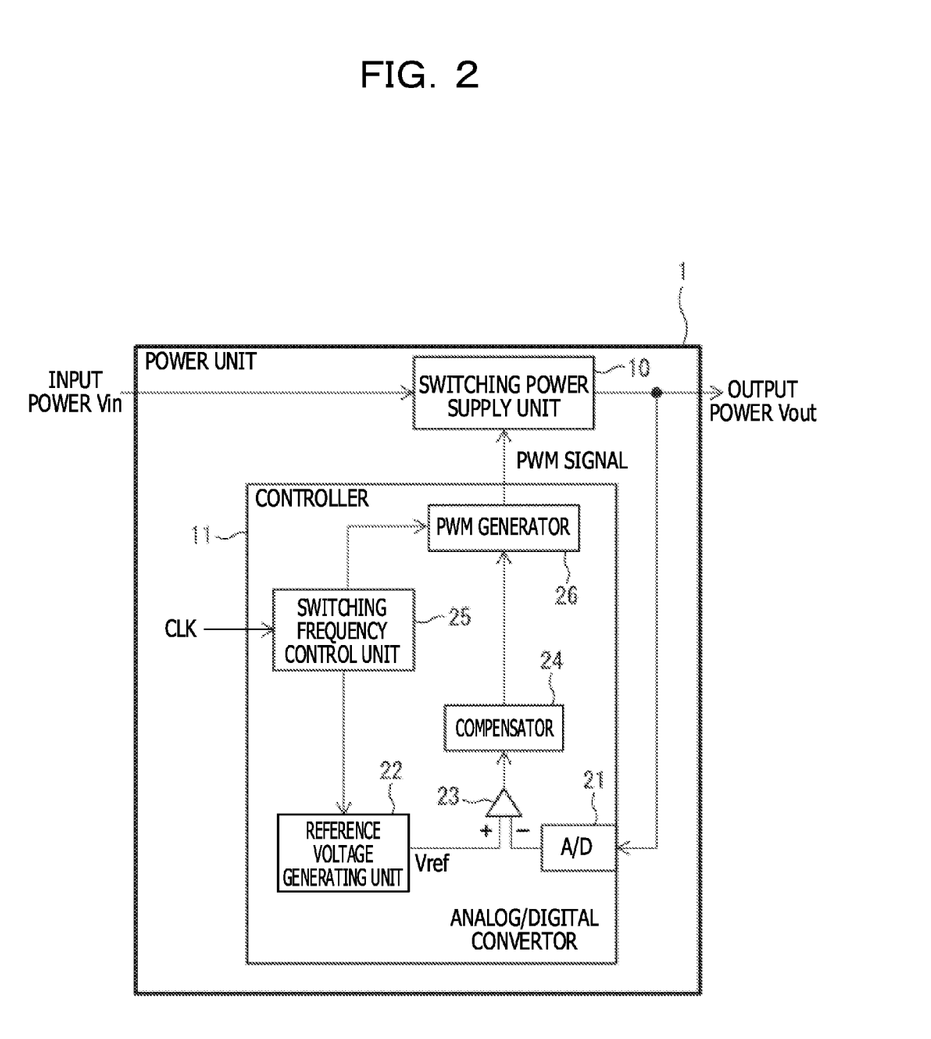
FIG. 2 is a view illustrating a configuration of a power supply device according to a first embodiment.

FIG. 2 is a view illustrating a configuration of a power supply device according to a first embodiment.

The power supply device 1 of the first embodiment includes a switching power supply unit 10 and a controller 11. The switching power supply unit 10 is supplied with a DC input voltage Vin from the outside and performs a switching operation in accordance with the PWM signal from the controller 11 to output a DC output voltage Vout. The controller 11 detects the output voltage Vout to change a duty ratio of the PWM signal so that the output voltage Vout has a predetermined voltage value. Further, the controller 11 spectrally spreads the period of the PWM signal to reduce a radiation noise generated in the switching power supply unit 10.

The controller 11 is implemented by a digital processing device such as a CPU, and performs a process of controlling the output voltage Vout to be maintained at a predetermined voltage value or spectrally spreading the period of the PWM signal by the digital processing. Further, as described below, an operating amount of the controller 11 of the power supply device 1 of the first embodiment is smaller than that of the above-described general device, so that it may be implemented using a CPU having a relatively small operation processing capacity or a part of an operation processing capacity of a CPU which also executes other processings.

The controller 11 includes an A/D converter 21, a reference voltage generating unit 22, a difference computing unit (subtractor) 23, a compensator (PI control unit) 24, a switching frequency control unit 25, and a PWM generator 26.

The A/D converter 21 converts the output voltage Vout into digital data. The reference voltage generating unit 22 generates and outputs a reference voltage Vref and changes a voltage value of the reference voltage Vref in accordance with a control signal from the switching frequency control unit 25. The difference computing unit (subtractor) 23 subtracts a digital data value of Vout output from the A/D converter 21 from the reference voltage Vref to output a difference between Vref and Vout. The compensator (PI control unit) 24 generates a comparison value U to be compared with a digital PWM carrier wave in the PWM generator 26 to determine a duty width, in which the digital PWM carrier wave is generated from the switching frequency control unit 25 and changed in a saw tooth waveform.

The switching frequency control unit 25 generates the digital PWM carrier wave at a main clock CLK to supply the digital PWM carrier wave to the PWM generator 26 and performs a spread spectrum processing which changes the period of the digital PWM carrier wave. The PWM generator 26 compares the digital PWM carrier wave with the comparison value U to generate a PWM signal. In the first embodiment, when the switching frequency control unit 25 changes the period of the digital PWM carrier wave, the switching frequency control unit 25 correspondingly outputs a control signal which changes a voltage value of the generated reference voltage Vref to the reference voltage generating unit 22.

Figure 3:
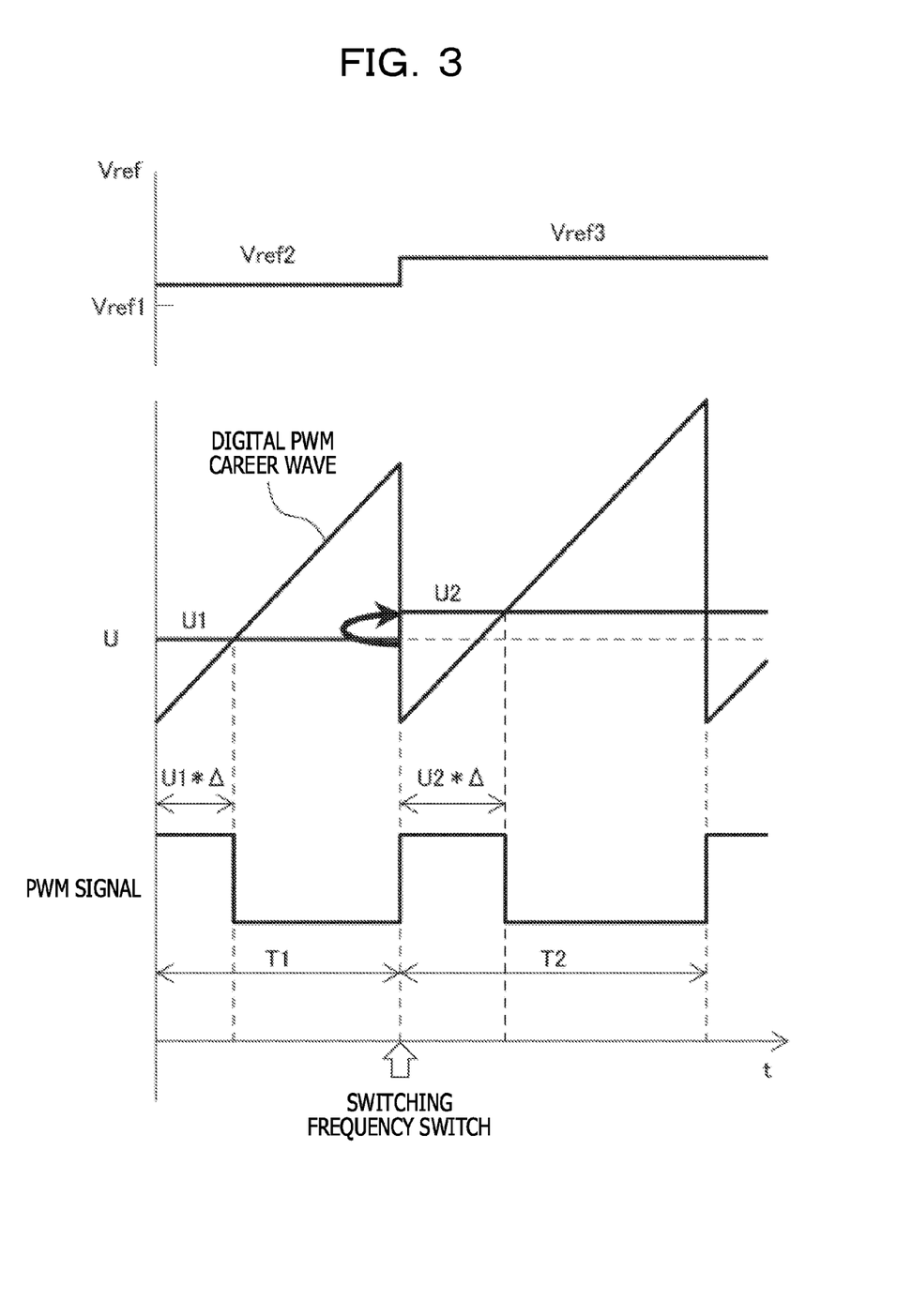
FIG. 3 is a view illustrating a period change of a digital PWM carrier wave, a change of a voltage value of a reference voltage, a change of a comparison value according to the change of the voltage value, and a change of a PWM signal in the first embodiment.

FIG. 3 is a view illustrating a period change of a digital PWM carrier wave, a change of a voltage value of the reference voltage Vref, a change of a comparison value U according to the change of the voltage value, and a change of a PWM signal in the first embodiment.

As illustrated in FIG. 3, the digital PWM carrier wave is a signal which is changed from zero to a maximum value in a saw tooth waveform (actually, stepwise as described below) at a clock period and the period is frequently changed in order to perform the spread spectrum processing. Here, the clock period is represented by Δ and a period value is represented by T. The maximum value of the digital PWM carrier wave is changed in accordance with the change of the period.

In FIG. 3, the period value of the digital PWM carrier wave is changed from T1 to T2 and the period value before T1 is T0. Here, it is described that the output voltage Vout is not changed. The changed reference voltage value is reflected into a comparison value U of a next period. For example, at a cycle having a period value of T0, the reference voltage Vref is Vref1 and thus the generated comparison value U is U1. In the period having a period value of T1, a value of the digital PWM carrier wave is compared with U1, and a PWM signal, in which a length of an ON period is U1×Δ, and a length of an OFF period is T1−U1×Δ, is generated. In this case, Duty (T1)=U1×Δ/T1. Similarly, at a cycle having a period value of T1, the reference voltage Vref is Vref2 and thus the comparison value U to be generated is U2. In the period of a period value T2, a PWM signal, in which a length of the ON period is U2×Δ and the length of the OFF period is T2−U2×Δ, is generated. In this case, Duty (T2)=U2×Δ/T2.

At a cycle having a period value of T2, when the comparison value U is U1 as it is, a period until a value of the digital PWM carrier wave exceeds U1 is similarly U1×Δ. However, since the period is changed to T2, Duty=U1×Δ/T2 so that the duty ratios (Duty) are varied. As described above, even though Vout is not changed, when the period of the digital PWM carrier wave is changed, the duty ratio (Duty) is changed. However, the duty ratio (Duty) needs to be maintained at the same value. Therefore, as described above, in the first embodiment, when it is known that the period value of the digital PWM carrier wave is changed from T1 to T2, Vref is correspondingly changed to Vref2. Therefore, even though the output voltage Vout is not changed, the difference is changed, the comparison value U is changed from U1 to U2, and a period until the value of the digital PWM carrier wave exceeds U2 is also changed to U2×Δ. Duty (T2)=U2×Δ/T2. Here, in order not to change Duty, U2 may be determined such that U1×Δ/T1=U2×Δ/T2. That is, the comparison value is changed from U1 to U2 so that U2=U1×T2/T1.

Here, descriptions will be made as to how to change Vref when the period of the digital PWM carrier wave is changed, together with the input voltage Vin and the output voltage Vout of the switching power supply unit and an error factor β.

The error factor in an input unit and an output unit in DC-DC conversion using the switching power supply unit according to the first embodiment is represented by β. The output voltage Vout is represented using the input voltage Vin and Duty (a ratio of a switching period and an ON time of a switch (transistor)) as follows.

$Vout = Vin \times Duty$

Therefore, $Duty = 1/\beta \times (Vout/Vin)$

When the switching period value is T, an output U of the compensator (PI control unit) is obtained as follows.

$Duty = 1/\beta \times (Vout/Vin)$

Therefore, the following value is output with the comparison value U.

$U = 1/\beta \times (Vout/Vin) \times (T/\Delta)$ [Equation 1]

The compensator is controlled such that the difference between the reference voltage Vref and the output voltage Vout is zero at a next period. That is, $Vref - Vout = 0$ Therefore, the comparison value U is controlled such that Vref=Vout. In Equation 1, when an output of a compensator at any period having a period value of T1 is U1 and an output of a compensator at a next period having a period value of T2 is U2, U1 and U2 will be represented as follows.

$U1 = 1/\beta \times (Vref/Vin) \times (T1/\Delta)$ [Equation 2]

$U2 = 1/\beta \times (Vref/Vin) \times (T2/\Delta)$ [Equation 3]

Further, Duty (T1) of a period having a period value of T1 and Duty (T2) of a period having a period value of T2 will be represented as follows.

$Duty\ (T1) = U1 \times (\Delta/T1) = 1/\beta \times (Vref/Vin)$ [Equation 4]

$Duty\ (T2) = U2 \times (\Delta/T2) = 1/\beta \times (Vref/Vin) \times (T1/T2)$ [Equation 5]

Therefore, the following equation may be obtained.

$Duty\ (T2) = Duty\ (T1) \times (T1/T2)$ [Equation 6]

Therefore, when the reference voltage Vref is constant and the frequency (period) is changed, the duty Duty is changed before and after the frequency, so that the output voltage Vout is changed.

In order to prevent this change, it is considered to change the comparison value U in accordance with the change of the frequency (period). However, in this case, it is required to perform an operation of the comparison value U in accordance with Equation (3) so that Duty (T2) matches Duty (T1) and thus an operation having a large operating amount is performed at every period.

Therefore, in the first embodiment, the comparison value U is not corrected, but the reference voltage value Vref is changed in accordance with a next period value at every period.

As described above, the changed reference voltage value is reflected into a comparison value U of a next period. For example, when a period length from zero period and a second period ranges from T0 to T2 and the reference voltage value ranges from Vref1 to Vref3, $U1=1/\beta \times (Vref1/Vin) \times (T0/\Delta)$ from the above Equation (2). Further, from Equation (4), Duty $(T1)=U1 \times (\Delta/T1)=1/\beta \times (Vref/Vin)$. Further, U2 and Duty (T2) are as follows.

$$U2=1/\beta \times (Vref2/Vin) \times (T1/\Delta) \quad \text{[Equation 7]}$$

$$\text{Duty } (T2)=U2 \times (\Delta/T2)=1/\beta \times (Vref2/Vin) \quad \text{[Equation 8]}$$

Here, the reference voltage value Vref2 is determined with respect to Vref1, as follows.

$$Vref2=Vref1 \times (T2/T1) \quad \text{[Equation 9]}$$

In Equation 7, when Vref2 of Equation 9 is substituted, the following result is obtained.

$$U2=1/\Delta \times (Vref1 \times (T2/T1)/Vin) \times (T1/\Delta)=1/\beta \times (Vref1/Vin) \times (T2/\Delta) \quad \text{[Equation 10]}$$

Therefore, Duty (T2) after the reference voltage value is changed is as follows.

$$\text{Duty } (T2)=U2 \times (\Delta/T2)=1/\beta \times (Vref1/Vin)$$

Therefore, Duty (T2)=Duty (T1), so that the voltage is not changed before and after the frequency is changed.

As described above, in the power supply device 1 of the first embodiment, when the switching frequency control unit 25 changes the frequency of the switching signal in order to spread the spectrum, the reference voltage Vref is changed in accordance with a frequency which will be changed next. As represented in Equation 9, the change of the reference voltage Vref is a simple operation of computing a period ratio of a switching signal to be changed and multiplying the ratio by the previous reference voltage value, and thus the operating amount is small. Therefore, the control unit which controls the output voltage Vout so as not to be varied when the frequency of the switching signal is changed in order to spread the spectrum may be implemented by using a cheap CPU whose computing capacity is not so high or a part of a computing function of another CPU.

Figure 4:
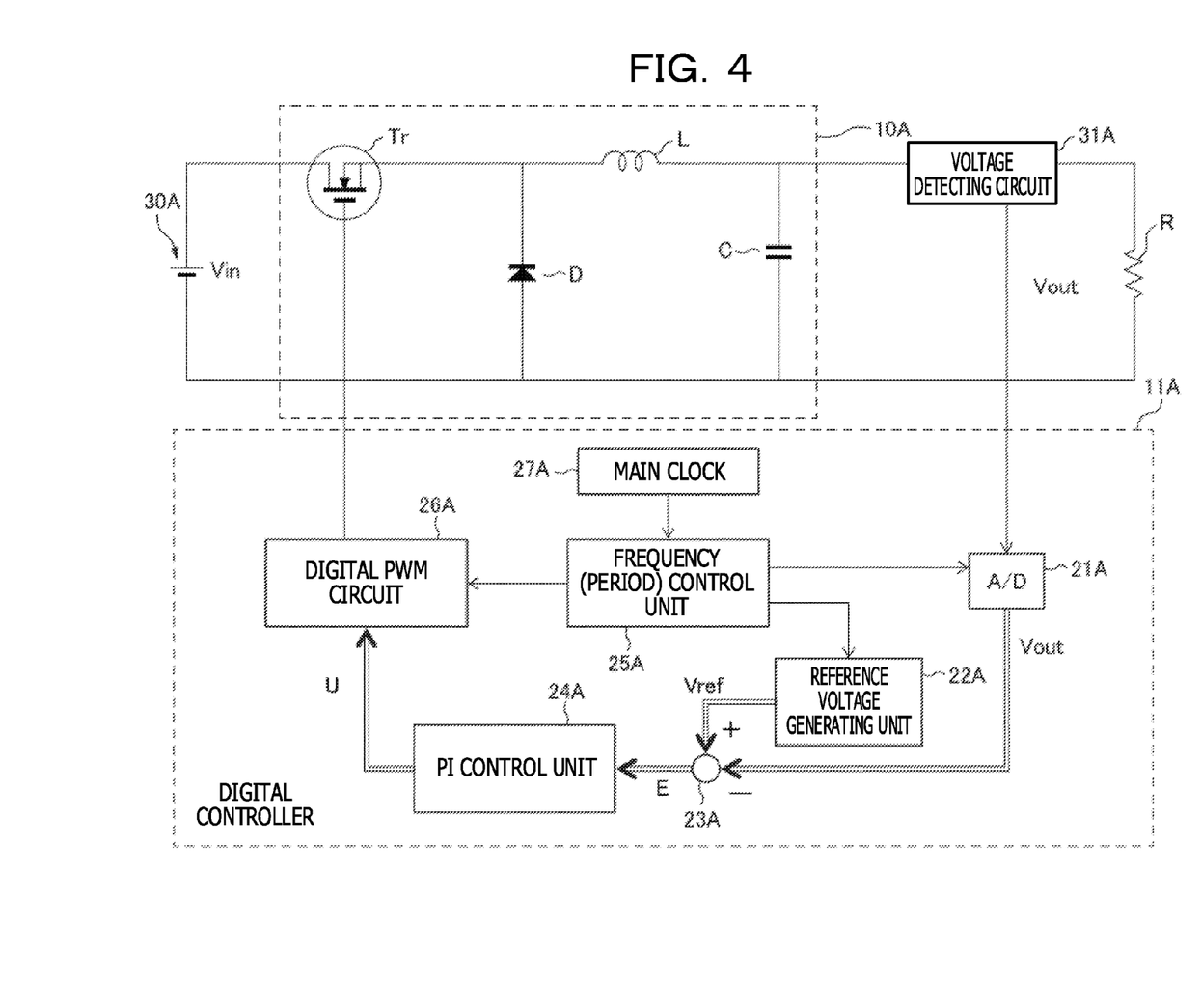
FIG. 4 is a view illustrating a specific circuit configuration of a power supply device according to the first embodiment.

FIG. 4 is a view illustrating a specific circuit configuration of a power supply device according to the first embodiment.

The power supply device of the first embodiment includes a switching power supply unit 10A and a controller 11A. The switching power supply unit 10A is a DCDC converter which is supplied with the DC power of an input voltage Vin in the DC power supply 30A and supplies a DC power of a predetermined output voltage Vout to a load R under the control of the controller 11A. A voltage detecting circuit 31A is a circuit which detects an output voltage Vout of the switching power supply unit 10A.

The switching power supply unit 10A includes a MOS transistor Tr, a diode D, an inductance element (choke coil) L, and a capacitor (a smoothing condenser) C. In the switching power supply unit 10A, the transistor Tr is turned on/off in accordance with a PWM signal supplied from the controller 11A and repeats an operation of charging the capacitor C. Since the operation of the switching power supply is well known, further descriptions will be omitted. The voltage detecting circuit 31A is a circuit which detects an output voltage Vout of the switching power supply unit 10A.

The controller 11A is a digital controller which is implemented by, for example, a CPU. As described below, since the operating amount is small, the controller 11A is implemented using a cheap CPU or a CPU which is also used to perform another control. The controller 11A includes an A/D converter 21A, a reference voltage generating unit 22A, a difference computing unit 23A, a compensator (PI control unit) 24A, a frequency (period) control unit 25A, a digital PWM circuit 26A, and a main clock source 27A. The A/D converter 21A, the reference voltage generating unit 22A, the difference computing unit 23A, and the compensator (PI control unit) 24A correspond to components denoted by the same reference numerals in FIG. 2. The frequency (period) control unit 25A and the digital PWM circuit 26A correspond to the switching frequency control unit 25 and the PWM generator 26 of FIG. 2. The main clock source 27A is an oscillator which generates a main clock CLK and may be provided outside the controller 11A.

Figure 5:
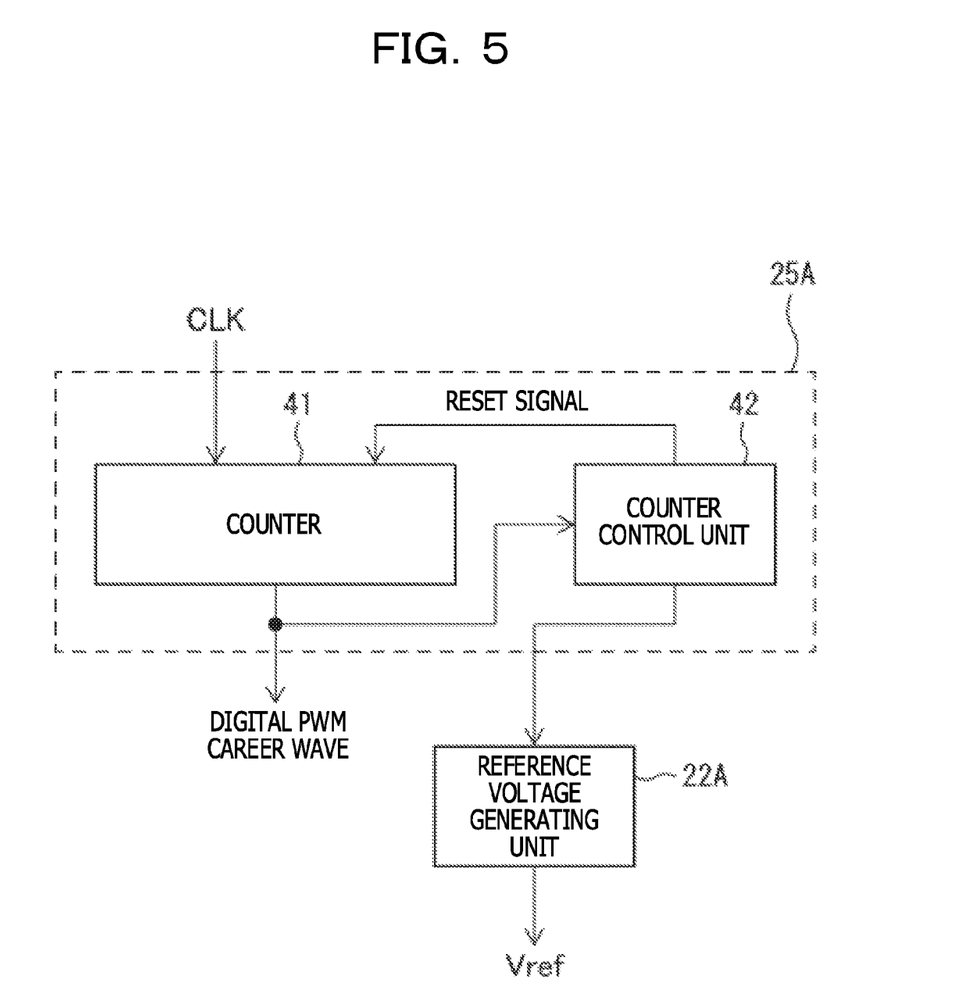
FIG. 5 is a view illustrating a configuration of a frequency (period) control unit.

FIG. 5 is a view illustrating a configuration of the frequency (period) control unit 25A.

Figure 6:
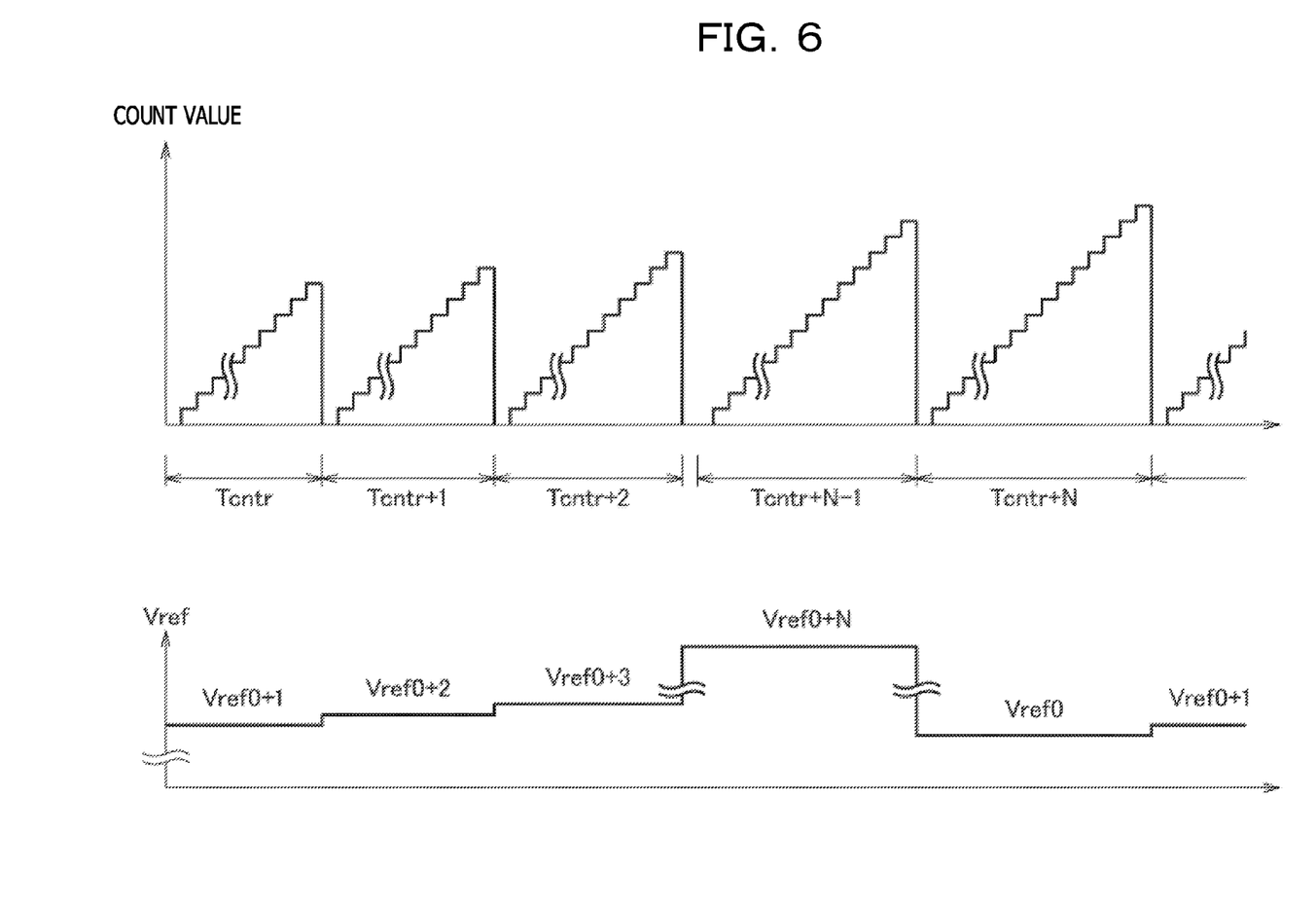
FIG. 6 is a view illustrating a digital PWM carrier wave which is output by a frequency (period) control unit.

FIG. 6 is a view illustrating a digital PWM carrier wave which is output by the frequency (period) control unit 25A.

The frequency (period) control unit 25A includes a counter 41 and a counter control unit 42. The counter control unit 42 receives a count value (a digital PWM carrier wave) from the counter 41 and outputs a reset signal when the count value becomes a set count value. The counter 41 counts the main clock CLK after the count value is zero in accordance with the reset signal and outputs the count value as the digital PWM carrier wave. When the count value becomes the set count value and the reset signal is output, the counter control unit 42 sets the set count value to a next value. The counter control unit 42 repeats an operation that increases the set count value by, for example, one from a lower limit value to an upper limit value and then sets the count value to the lower limit value again when the set count value is the upper limit value. Further, the counter control unit 42 outputs the reset signal, sets the next set count value, and instructs a reference voltage value corresponding to the set count value to be subsequently set, to the reference voltage generating unit 22A.

FIG. 6 is a view illustrating a modified example of the digital PWM carrier wave and the reference voltage value.

As illustrated in FIG. 6, the count value from the counter 41 is increased by one from zero to the set count value and returns to zero when the count value becomes the set count value. Therefore, an operation of increasing a value between zero and the set count value in a stepwise manner is repeated. For example, when the set count value is Tcntr, the time is Tcntr×Δ (a length of one period of CLK). A time until the count value reaches the set count value from zero corresponds to one period of the PWM signal.

The set count value is set so as to be increased by one from the lower limit value Tcntr to be changed to the upper limit value Tcntr+N. Therefore, a time until the count value of the counter 41 reaches the set count value from zero is prolonged by 1Δ. Since the set count value is set so as to be increased to Tcntr+N from Tcntr by one and return to Tcntr again when the set count value is Tcntr+N. Thus, an operation of changing the period of the PWM signal from Tcntr×Δ to (Tcntr+N)×Δ and then returning the period to Tcntr×Δ again is repeated. Therefore, the switching frequency of the switching power supply unit 10A is changed at every one period so that the spectrum spread is performed.

As described above, since the value of the changed reference voltage Vref is reflected to the comparison value U of the next period, the reference voltage Vref is changed at a previous period ahead of the current period by one.

Figure 7:
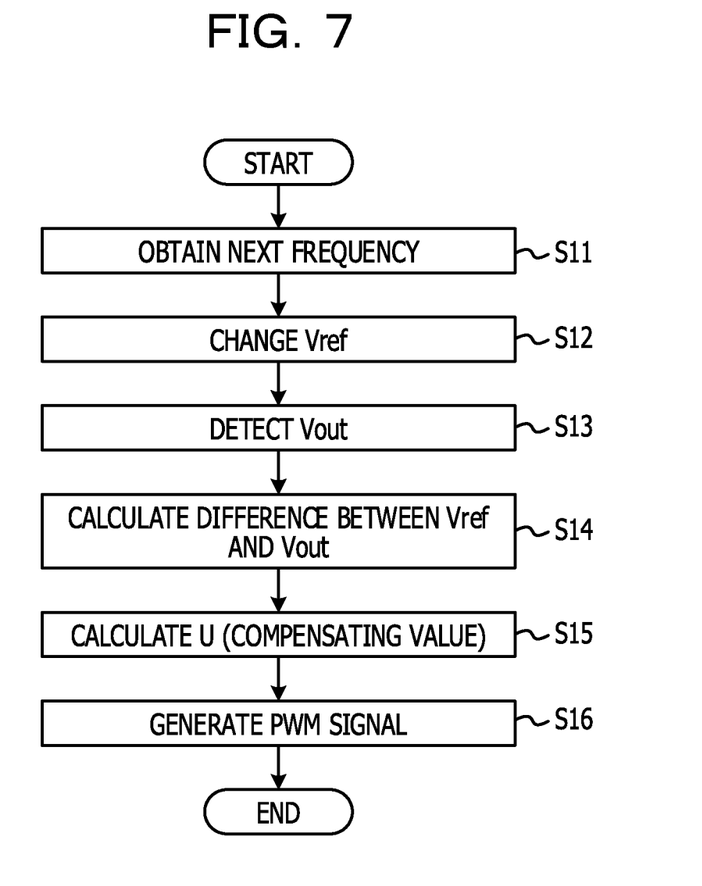
FIG. 7 is a flowchart illustrating a process in a controller 11A.

FIG. 7 is a flowchart illustrating a process in a controller 11A.

In step S11, the frequency (period) control unit 25A changes the frequency (a period length) of the PWM signal and then obtains a frequency (a period length) T2 of a subsequent period of the PWM signal.

In step S12, the frequency (period) control unit 25A determines the reference voltage Vref2 to be changed according to the above-mentioned Equation (9), from the current period length T1 of the PWM signal and the corresponding reference voltage value Vref1 (which is set at the immediately previous period), and the above-described T2. The reference voltage generating unit 22A sets the reference voltage to Vref2.

In step S13, the A/D converter 21A detects (reads out) Vout.

In step S14, the difference computing unit 23A calculates a difference between Vref2 and Vout.

In step S15, the compensator (PI control unit) 24A calculates a comparison value (compensating value) U from the difference between Vref2 and Vout.

In step S16, the digital PWM circuit 26A compares the PWM carrier wave output from the frequency (period) control unit 25A with the comparison value (a compensation value) U to generate a PWM signal (ON period).

As described above, the PWM signal is generated and is supplied to MOSTr of the switching power supply unit 10A.

As described above, in the first embodiment, even though the spread spectrum PWM signal is generated and the frequency (period) of the PWM signal is changed, an operation for constantly maintaining the output voltage Vout is an operation having a small operating amount as represented in Equation (9).

Next, a power supply device according to a second embodiment will be described.

The power supply device of the second embodiment includes the same configuration as the power supply device of the first embodiment as illustrated in FIGS. 2 and 4 and performs a similar operation. However, the change of the PWM carrier wave is associated with the change of the reference voltage value so that the operating amount is further reduced.

In the first embodiment, the operation of Equation 9 is required to be performed at every switching, that is, at every period of the PWM signal. An object of spectrum spread in the embodiment is to suppress an unnecessary radiation noise, so that a variation ratio of the frequency (period) of the switching signal does not need to be constant. Therefore, in the second embodiment, the change of the reference voltage is associated with the process of generating the PWM carrier wave so that the operation is further simplified.

As described above, frequency conversion of the spread spectrum PWM signal is implemented by incrementing the set count value by +1 (or −1) at every switching (PWM signal) period. An operation of increasing the set count value by one from the lower limit value to the upper limit value and returning the set count value to the lower limit value again is repeated.

Figure 8:
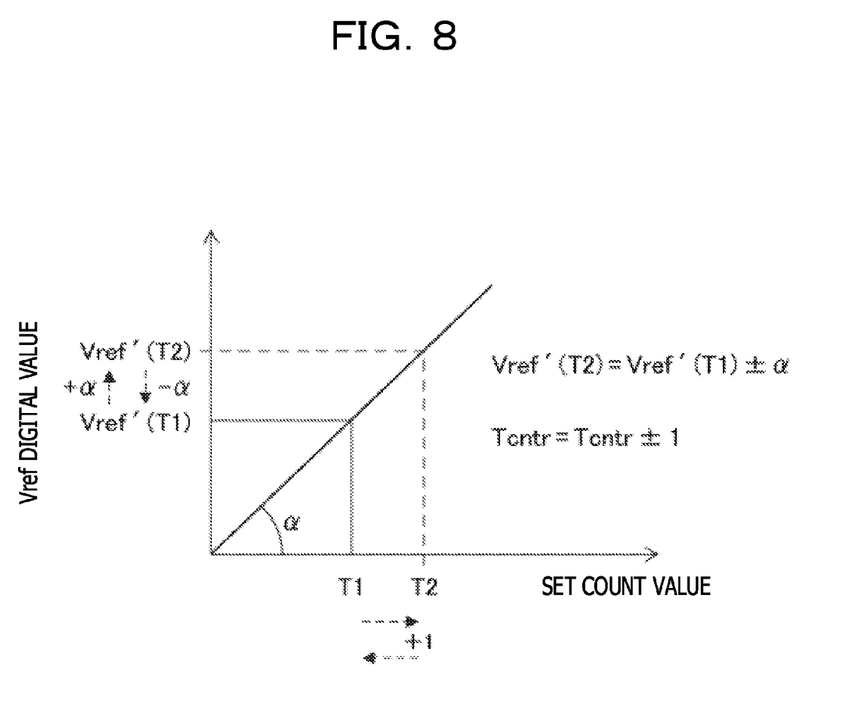
FIG. 8 is a view illustrating a relationship between a set count value and a digital value of a reference voltage in a second embodiment.

FIG. 8 is a view illustrating a relationship between a set count value and a digital value of a reference voltage in a second embodiment.

In the second embodiment, a digital value of the reference voltage is set to be a times (an integer multiple) of the set count value. That is, Vref=α×Tcntr. Therefore, in response to addition (or subtraction) of the set count value by one, the reference voltage is also implemented by adding (or subtracting) a fixed value a and the operation is configured only by addition.

For example, when the main clock CLK is 100 MHz (a period of 10 ns) and a base switching frequency is 100 kHz (a period of 10 μm), a lower limit set count value Tcntr is 1000. An upper limit set counter value Tcntr+N is 1050 (95.2380952 kHz), a lower limit reference voltage value is 10 V, and an upper limit reference voltage value is 10.50 V. Further, α=2, a digital value of the lower limit reference voltage value of 10 V is 2000, and a digital value of the upper limit reference voltage value 10.50 V is 2100.

Therefore, since a ratio of the period at every frequency switching and a ratio of the reference voltage are equal at every time, the duty Duty before and after switching the switching frequency (period) is always maintained constantly. That is, the voltage is not changed in accordance with the switching of the switching frequency (period).

In the above described example, even though an example of increasing the count value of the counter 41 has been described, the count value may be decreased.

As described above, in the second embodiment, even though the spread spectrum PWM signal is generated and the frequency (period) of the PWM signal is changed, an operation for constantly maintaining the output voltage Vout is configured only by the addition and subtraction, thereby further reducing an operating amount.

Figure 9:
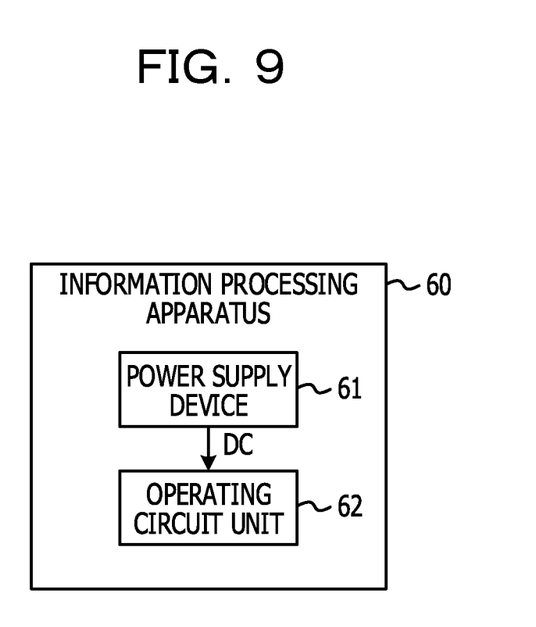
FIG. 9 is a view illustrating a configuration of an information processing apparatus using a power supply device of the first or the second embodiment.

FIG. 9 is a view illustrating a configuration of an information processing apparatus using a power supply device of the first or the second embodiment.

The information processing apparatus 60 includes a power supply device 61 and an operating circuit unit 62 which receives a DC power from the power supply device 61 to operate. The power supply device 61, for example, receives a DC power from a battery mounted in the information processing apparatus 60 to convert the DC power into an operating voltage of the operating circuit unit 62.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:
1. A power supply device comprising:
switching power supply circuitry which operates in accordance with a PWM signal;
an oscillator that generates a main clock; and
a controller configured to generate the PWM signal, the controller including:

switching frequency control circuitry configured to generate a digital PWM carrier wave and to change a frequency of the digital PWM carrier wave based on the main clock, the digital PWM carrier wave being changed from zero to a maximum value stepwise at a clock period, output voltage detecting circuitry configured to detect an output voltage of the switching power supply circuitry, reference voltage circuitry configured to generate a reference voltage, a compensator configured to generate a compensating value from the output voltage of the switching power supply circuitry and the reference voltage, and a PWM generator configured to generate the PWM signal from the digital PWM carrier wave and the compensating value, and wherein the reference voltage circuitry changes the generated reference voltage in accordance with a change of the period of the digital PWM carrier wave.

2. The power supply device according to claim 1, wherein the controller is a digital operating circuit which operates in accordance with the main clock.

3. The power supply device according to claim 2, wherein the reference voltage circuitry changes the reference voltage so as to generate the PWM signal which constantly maintains the output voltage before and after the change of the period of the digital PWM carrier wave.

4. The power supply device according to claim 3, wherein the reference voltage circuitry changes the generated reference voltage in proportion to the change of the period of the digital PWM carrier wave.

5. An information processing apparatus comprising:

a power supply device, the power supply device including:

switching power supply circuitry which operates in accordance with a PWM signal;

an oscillator that generates a main clock; and a controller configured to generate the PWM signal, the controller including:

switching frequency control circuitry configured to generate a digital PWM carrier wave and to change a frequency of the digital PWM carrier wave based on the main clock, the digital PWM carrier wave is changed from zero to a maximum value stepwise at a clock period;

output voltage detecting circuitry configured to detect an output voltage of the switching power supply circuitry;

reference voltage circuitry configured to generate a reference voltage;

a compensator configured to generate a compensating value from the output voltage of the switching power supply circuitry and the reference voltage;

a PWM generator configured to generate the PWM signal from the digital PWM carrier wave and the compensating value, and an operating circuit configured to operate by a DC power supplied from the power supply device, wherein the reference voltage circuitry changes the generated reference voltage in accordance with a change of the period of the digital PWM carrier wave.

* * * * *